June 25, 1935.  K. M. WHITE  2,005,878
ELEVATOR CONTROL SYSTEM
Original Filed Oct. 29, 1932  4 Sheets-Sheet 2

WITNESSES:

INVENTOR
Kenneth M. White.
BY
ATTORNEY

June 25, 1935.　　　　K. M. WHITE　　　　2,005,878
ELEVATOR CONTROL SYSTEM
Original Filed Oct. 29, 1932　　4 Sheets-Sheet 3
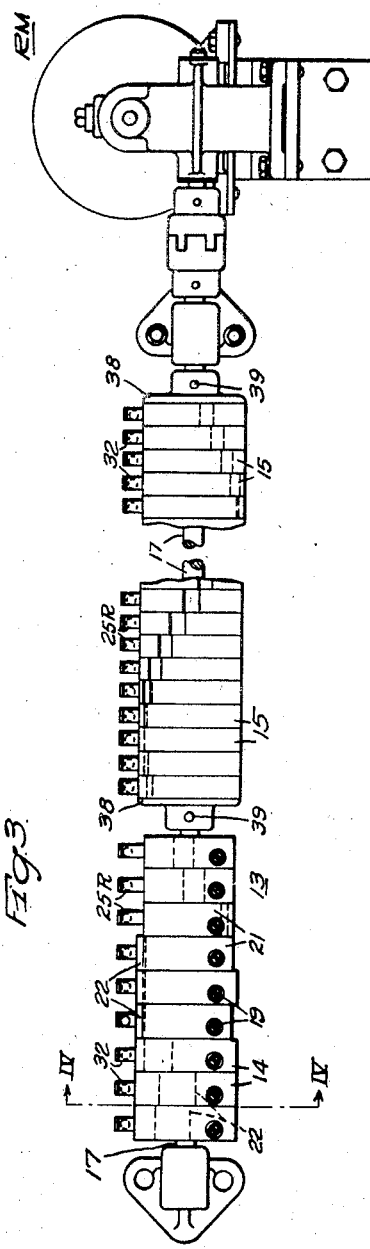
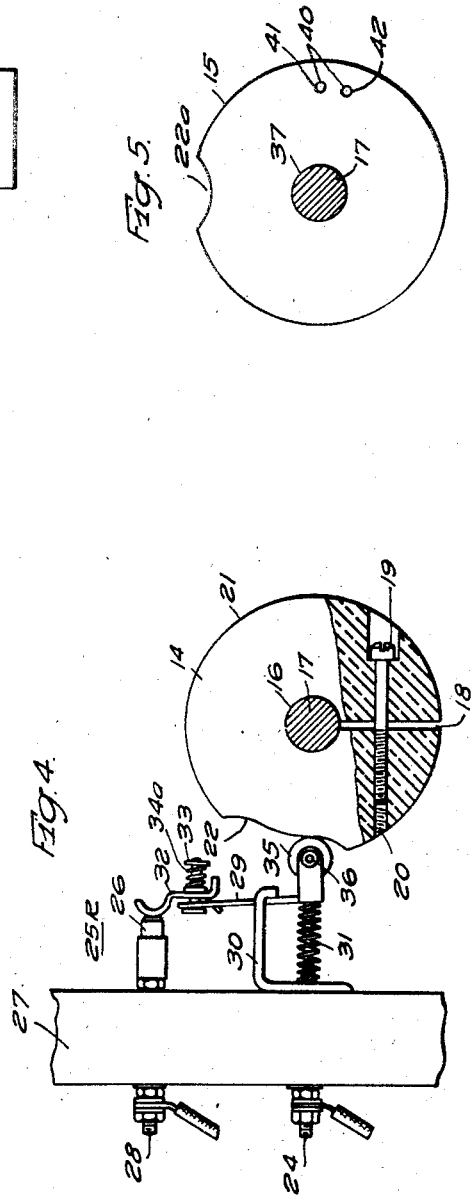
WITNESSES:
E.A. McCloskey
C.S. Minkler
INVENTOR
Kenneth M. White.
BY
ATTORNEY June 25, 1935.  K. M. WHITE  2,005,878
ELEVATOR CONTROL SYSTEM
Original Filed Oct. 29, 1932  4 Sheets-Sheet 4
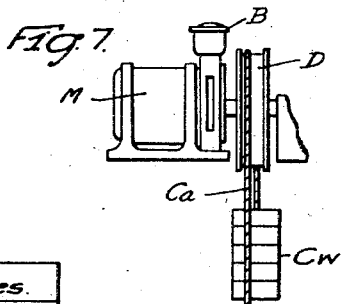
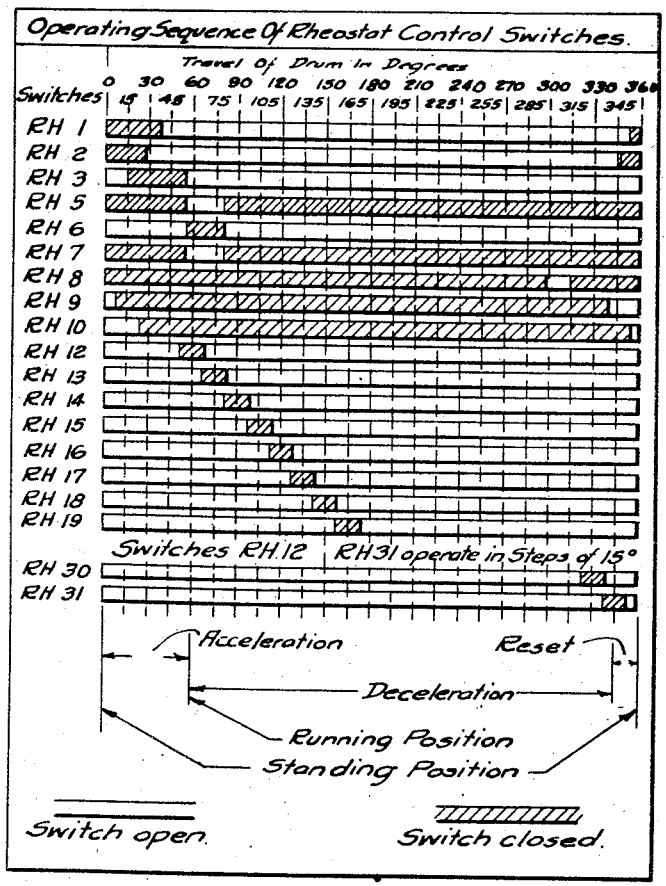
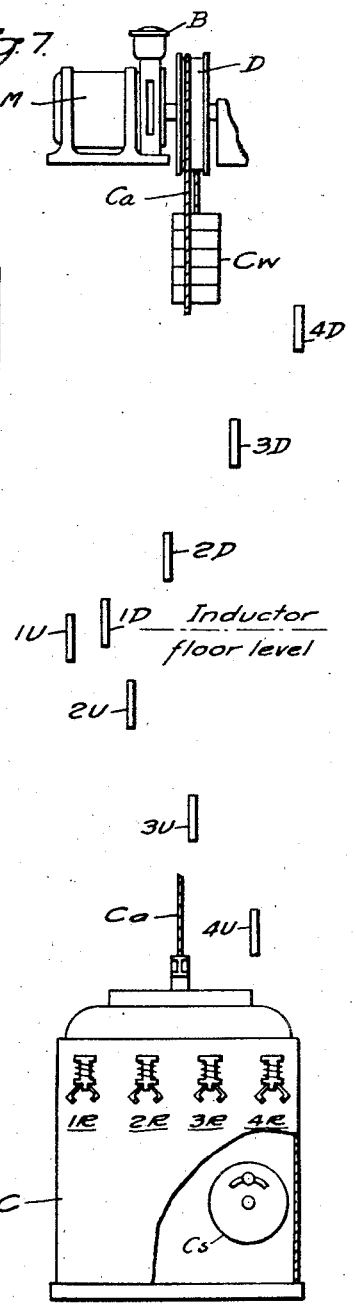
WITNESSES:
INVENTOR
Kenneth M. White.
BY
ATTORNEY Patented June 25, 1935

2,005,878

UNITED STATES PATENT OFFICE 2,005,878

ELEVATOR CONTROL SYSTEM

Kenneth M. White, Mooresville, Ind., assignor to Westinghouse Electric Elevator Company, Chicago, Ill., a corporation of Illinois Application October 29, 1932, Serial No. 640,173
Renewed October 19, 1934

23 Claims. (Cl. 172—152).

My invention relates to elevator control systems, particularly those of the variable-voltage or Ward-Leonard type, in which a regulating generator varies the field excitation of the main generator in accordance with the difference between the speed of the elevator motor and a predetermined speed, independently of the load on the elevator motor, for the purpose of causing the motor to operate in substantial conformity with a predetermined speed characteristic independently of load, and has particular relation to a motor-operated rheostat control mechanism for the separately excited field winding of the main generator, whereby changes in the excitation of the field winding may be effected in such manner as to cause the elevator car to travel in accordance with a predetermined speed characteristic without any sudden changes in speed occurring.

In Patent No. 1,884,446, October 25, 1932, George K. Hearn and myself, and assigned to the Westinghouse Electric Elevator Company, there is described and claimed an elevator control system embodying a regulating generator for controlling the excitation of the separately excited shunt-field winding of the main generator of a variable-voltage system for the purpose of causing the elevator motor to closely conform to a predetermined speed curve regardless of the load on the motor.

In the system disclosed in the above-mentioned copending application, a change in the excitation of the separately excited shunt-field winding of the main generator is effected, particularly on deceleration, in a comparatively small number of large increments of change.

I have found that the system as disclosed in the above-mentioned copending application is subject to certain disadvantages, which result from the fact that the excitation of the separately excited shunt-field winding of the main generator is reduced in a few successive steps of comparatively large incremental change, and which I will point out briefly.

It should be understood that in an elevator system embodying a regulating generator, such as that described in the above-mentioned copending application, a potentiometer device is employed for changing the excitation of the separately excited shunt-field winding of the main generator in proportion to the speed desired. The effect of the regulating generator is to force the car to follow the abrupt changes in the excitation of the shunt-field winding. In other words, the regulating generator acts to reduce the excitation of the separately excited shunt-field winding of the main generator to a further degree in an effort to force the speed of the car down. When the speed of the car reaches the desired value the voltage supplied by the regulating generator becomes zero, but due to the inductance of the separately excited shunt-field windings of the main generator the current therethrough cannot immediately rise again to the predetermined value corresponding to the particular setting of the potentiometer. The ultimate result of such momentary delay is that the elevator car speed drops or dips momentarily below the predetermined value on the speed curve desired and then rises again. Thus, there is a sudden change in the speed of the car which is distinctly noticeable and which constitutes a factor of annoyance and even physical discomfort to passengers.

It is possible to effect succeeding incremental changes in the excitation voltage supplied from the potentiometer just previous to the occurrence of the dip in speed, and thus a slow-down curve may be effected which progresses from step to step without sudden changes. However, the difficulty still remains when the final step of change in excitation voltage occurs. I have found that the adjustment at this particular time is very critical in that if the rate of slow-down changes slightly over the load range so that if the momentary dip in speed occurs in advance of the initiation of the succeeding incremental change in excitation voltage, the speed at slow down is uncertain and irregular. This naturally interferes with a consistent accuracy of landing. Furthermore, the inaccuracy becomes more pronounced as the speed of landing decreases because the voltage supplied by the regulating generator becomes larger in proportion to the degree of excitation voltage supplied from the potentiometer. This final effect is most disadvantageous because the greatest accuracy of control is required at the lowest speed, that is, the landing speed near the floor, at which an elevator car is to stop, in order to effect an accurate landing consistently.

In order to remedy the defects as above pointed out, I propose to employ a motor-operated rheostat for changing the excitation voltage of the separately excited shunt-field winding of the main generator in a succession of a comparatively large number of small incremental changes, rapidly traversed, in order that the desired smooth slow-down curve be closely followed. A powerful regulating generator can incidentally be used without causing the occurrence of the disadvantages described.

By thus gradually changing the excitation of the separately excited shunt-field winding of the main generator, the speed correction effect caused by the regulating generator is effective to cause the elevator car to conform closely to a predetermined speed curve without sudden changes in the speed occurring. In other words, by employing the control system which I have devised, I insure, under all conditions of load on the car, a speed curve for the elevator car substantially identical with respect to a predetermined speed curve which is designed to effect a smooth change in the speed of the elevator car.

I propose to control the motor-operated rheostat for the separately excited shunt-field winding of the main generator, so that it changes the excitation of the field-winding periodically at predetermined times so selected that the speed of the elevator car is changed according to a predetermined curve. I furthermore propose to control the motor-operated rheostat in accordance with the position of the elevator car in a hatchway in such manner that further change of the excitation of the separately excited shunt-field winding of the main generator is prevented, unless the elevator car has attained a predetermined position in the hatchway. That is, in the event that the elevator car does not move in accordance with the predetermined speed curve, the operation of the motor-operated rheostat is automatically stopped until the elevator car attains and passes the predetermined position in the hatchway, at which time, the rheostat motor is again automatically started and a further change in the excitation of the separately excited shunt-field winding of the main generator thereby effected.

In order to cause the motor-operated rheostat to be immediately effective at the time of starting an elevator car, I propose to provide control means for causing the rheostat motor to reset or readjust the rheostat or potentiometer to the correct starting position whenever the elevator car stops. The resetting may be effected by reversing the direction of movement of a switch operating drum employed to control the tap connections to the rheostat, or by continuing the movement of the switch operating drums in the same direction as for the cycle of deceleration, until the operating drum reaches the predetermined position necessary for starting the elevator car.

It is an object of my invention, therefore, to cause an elevator car to conform with a high degree of accuracy to a predetermined speed curve having no abrupt changes or variations therein.

It is another object of my invention to cause an elevator car to quickly respond to any desired change in the speed thereof without causing sudden changes in the speed of the car.

It is another object of my invention to control the voltage applied to an elevator motor by varying the voltage in a comparatively large number of small increments at periodic predetermined times, and in such manner that successive incremental changes are dependent upon the position of the elevator car in the hatchway.

It is a further object of my invention to provide an elevator control system embodying a motor-operated rheostat controlled in accordance with the position of the elevator car in the hatchway.

It is a still further object of my invention to provide an elevator control system embodying a regulating generator for conforming the speed of an elevator car to a predetermined curve, regardless of load; and a motor-operated rheostat control device whereby sudden changes in the effect created by the regulating generator are obviated.

It is also an object of my invention to provide an elevator control system embodying a motor-operated rheostat control device, and means for controlling the operation of the motor-operated rheostat, dependent upon the operation of the elevator car.

Other objects of my invention will be readily apparent from the following description and explanation of the operation of my invention when read in connection with the accompanying drawings, wherein:

Figures 1 and 2, taken together, constitute a diagram showing one embodiment of my invention;

Fig. 3 is a view, in side elevation, showing the switch operating drum associated with a control rheostat or potentiometer, and the driving motor for the drum;

Fig. 4 is an enlarged view, partly in section, taken on line IV—IV of Fig. 3, showing the nature of one of the cams constituting the switch operating drum as well as the details of structure of the various switches controlling the tap connections to the rheostat or potentiometer;

Fig. 5 is a side elevational view showing the contour of another of the cams constituting the switch operating drum shown in Fig. 3;

Fig. 6 is a diagram showing the sequence of operation of the various switches or contact members operated by the switch operating drum shown in Fig. 3; and Fig. 7 is a diagrammatic view, illustrating an elevator car and its driving motor and showing a set of stopping inductor plates for one floor which are stationarily mounted in a hatchway and which cooperate with respectively associated inductor relays mounted on the elevator car.

Figure 1:
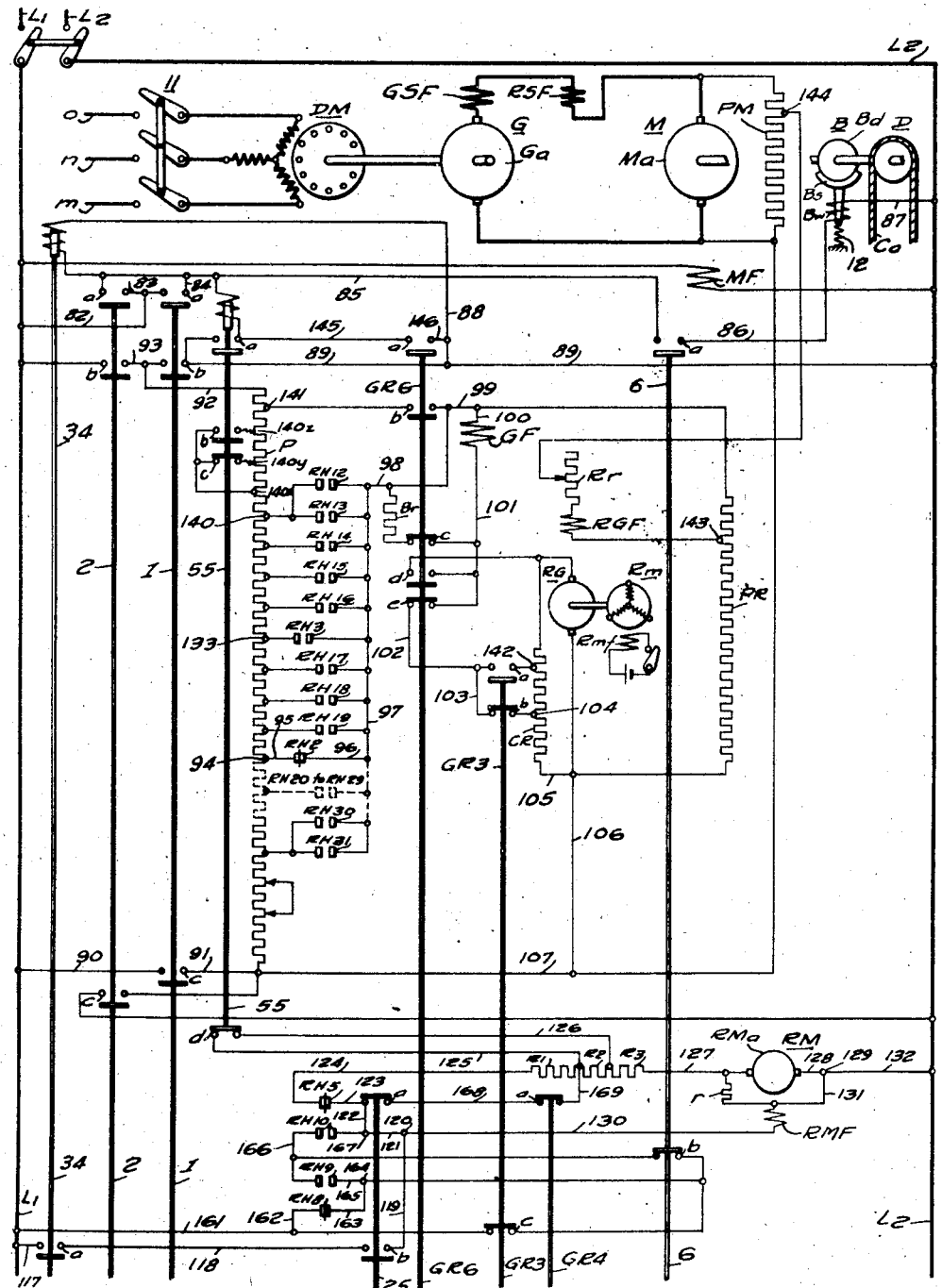
Figure 2:
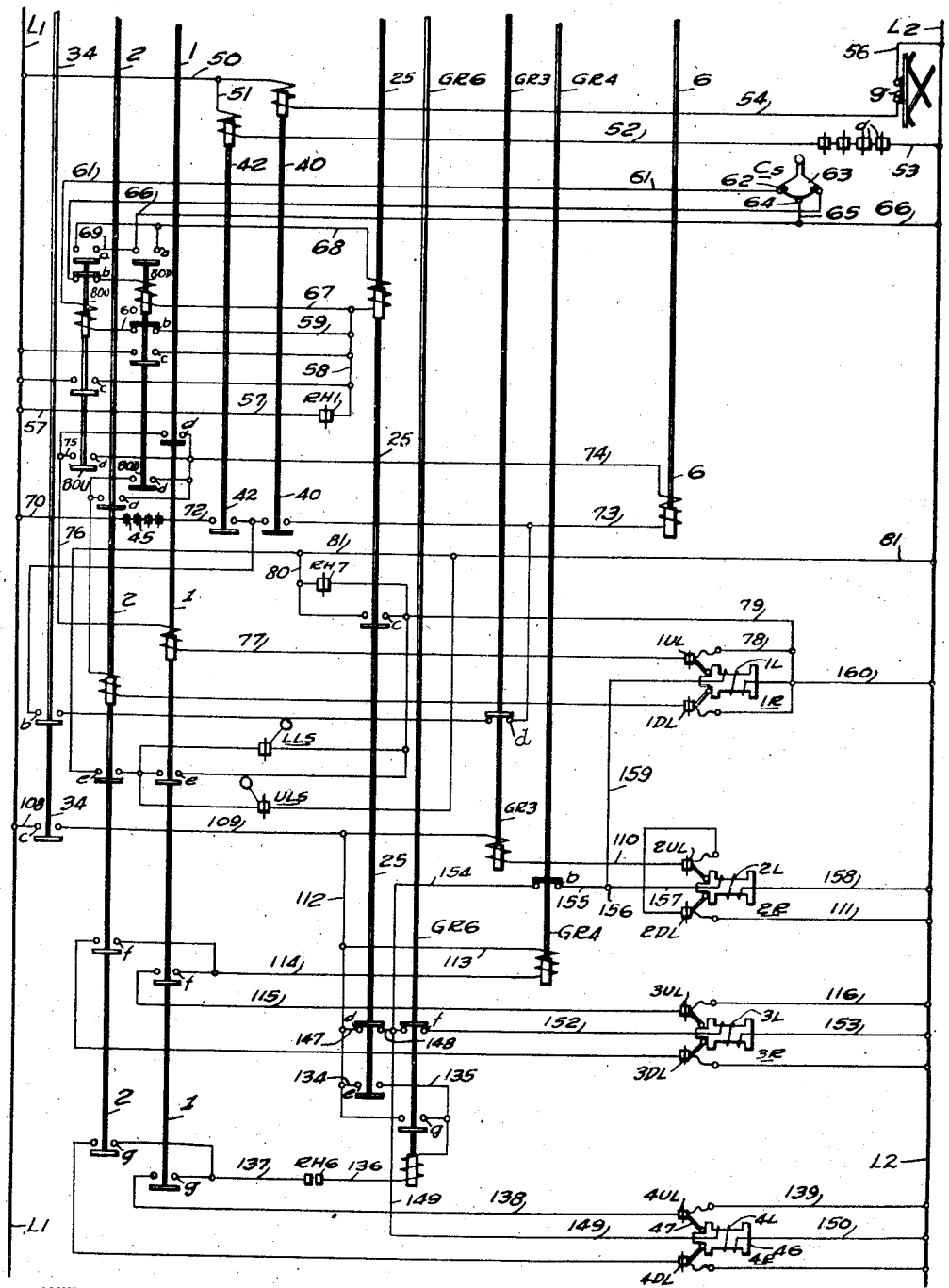

Referring to the diagram shown in Figs. 1 and 2 taken together, the elevator control system illustrated includes an elevator motor M, a main generator G for supplying power to the elevator motor M, and a driving motor DM of any suitable type for driving the generator G. The motor M, the generator G and the driving motor DM are mutually associated after the manner of the well-known Ward-Leonard system of control, the armature winding $Ma$ of the motor M being connected in loop circuit with the armature winding $Ga$ of the generator G and a series-field winding GSF of the generator G, and a separately excited shunt-field winding GF of the generator G having the degree of its energization as well as the direction thereof controlled in such manner as to control the speed and direction of rotation, respectively, of the elevator motor armature $Ma$. A separately excited shunt-field winding MF is provided for the elevator motor M.

The armature of the generator G and the rotating element of the driving motor DM are suitably connected,—either directly, as shown, by mounting on a common shaft, or through the medium of suitable gear mechanism. The driving motor DM, which is illustrated as an induction motor of a three-phase type, is energized from the three-phase supply conductors $m$—$n$—$o$, and a suitable switch II serves to connect the windings of the motor DM to the conductors $m$—$n$—$o$.

A hoisting drum D, suitably driven by the armature of the motor M, is provided with a cable Ca, suitably supported thereby, for connecting an elevator car C (see Fig. 7) to a suitable counterweight Cw.

A suitable brake B is provided for the elevator motor M, and it comprises, for example, a brake drum Bd suitably connected to the armature shaft of the elevator motor M, a brake shoe Bs for frictionally engaging the brake drum Bd in response to the action of a biasing member, such as a spring 12, and a brake releasing solenoid or winding Bw which is energizable, whenever the elevator motor is actuated to move the elevator car, to cause the brake shoe Bs to disengage the brake drum Bd.

Relays 1 and 2 are provided for controlling the direction of the energization of the separately excited shunt-field winding being energized in one direction when relay 1 is actuated to close its contact members, and being energized in the opposite direction when the relay 2 is actuated to close its contact members.

A suitable regulating generator RG is provided which has its armature winding connected in series-circuit relation with the shunt-field winding GF of the generator G, and which has two separate field windings RSF and RGF. The field winding RSF is connected in the loop circuit between the armature windings of the elevator motor M and the main generator G, whereby one component of the field of the regulating generator RG corresponds to the current flowing in the loop circuit. The winding RGF of the regulating generator RG is energized in accordance with the difference in potential between the terminal voltage of the elevator motor armature winding and the excitation voltage impressed on the shunt-field winding GF of the generator G. For the purpose of providing a more flexible control of the voltage impressed on the field winding RGF, resistance potentiometers PM and PR are provided which are connected, respectively, across the brush terminals of the elevator motor M and across the series circuit including the shunt-field winding GF and the armature winding of the regulating generator RG. A variable resistor Rr is employed in series-circuit relation with the field winding RGF for the purpose of adjusting the ratio between the m. m. f.'s of field windings RGF and RSF.

A potentiometer resistor CR connected across the brush terminals of the regulating generator RG is provided for the purpose of controlling the amount of the voltage, generated by the regulating generator RG, in its effect upon the energization of the shunt-field winding GF, as will be explained in further detail hereinafter.

A discharge or balancing resistor Br is provided for short circuiting the generator shunt-field winding GF.

The degree of energization of the generator shunt-field winding GF is controlled automatically in such manner that the elevator motor causes the elevator car to travel in substantial conformity to a predetermined speed curve, regardless of the load on the elevator car, by means of the regulating generator RG which is driven at a constant speed by a suitable motor, such as a synchronous motor Rm, which is provided with a field winding Rmf energized from a direct-current source of energy.

The energization of the shunt-field winding GF of the generator G is effected through the medium of a control rheostat or resistance potentiometer P. A plurality of switches or contact members RH1 to RH31 is provided in part for effecting certain functions, which will be hereinafter explained, and also for controlling the tap connections to the rheostat P whereby the energization of the shunt-field winding GF may be controlled.

The switches RH1 to RH31 are actuated in accordance with a predetermined operational sequence, as illustrated in Fig. 6, by means of an operating drum 13 (see Fig. 3), which is driven by a motor RM.

Referring to Figs. 3, 4 and 5, the switch operating drum comprises a plurality of adjustable cam members 14 and a plurality of non-adjustable cam members 15. The cam members 14 are of any suitable insulating material, such as hard rubber, fibre or other substance, and of substantially disc-like form. A suitable hole 16, preferably circular in form, extends axially through the cam member for permitting a shaft 17 which conforms closely to the contour of the hole 16 to extend therethrough. Each cam member 14 is further provided with a radially extending slot or opening 18 extending from the outer periphery of the cam member to the axial hole 16. An adjusting screw 19, having threads thereon cooperating with a threaded hole 20 in the cam member, is provided for drawing the opposing ends of the cam member 14 adjacent the radial slot 18 together to securely fasten the cam member, by compressive action, to the shaft 17. The outer periphery 21 of the cams 14 is interrupted at a portion thereof by a depressed portion 22 of predetermined length, as will be hereinafter explained, for effecting the sequential operation of a plurality of switches 25R.

Each of the cam members 14 and 15 operates a switch 25R corresponding thereto, respectively, in accordance with the length of a depression 22 and its relative angular position with respect to the depressions in other cam members.

All of the switches 25R are of any suitable type which are actuable to open and closed positions by the cooperation of the cam members therewith. I prefer, however, to employ switch members of a simple and effective character such as that shown in Fig. 4. Each of the switches 25R, as shown in Fig. 4, comprises a suitable contact member 26, stationarily secured to a supporting member 27 by means of a suitable bolt-like portion 28 thereof which extends through the base 27. Suitable nuts are provided for the bolt-like portion 28 for tightly securing the contact member 26 to the base 27 and also for connecting an electrical conductor to the bolt-like portion 28. A movable contact arm 29 is pivotally mounted on a suitable L-bracket 30 secured to the base 27 by means of a suitable bolt 24, which is provided with a head portion in contact with the bracket 30 and which extends through the base portion 27. Suitable nuts are provided for the bolt 24 for tightly securing the bracket and also connecting an electrical conductor to the bolt itself.

The contact arm is provided with a pair of shoulders which engage the upper face of the bracket 30, and is also provided with a tongue-like portion which extends through a slot in the bracket 30 to a point below the bracket. A compression spring 31 is interposed between the supporting base 27 and the lower movable end of the pivoted arm 29 for normally biasing the contact arm 29 into a position such that a contact finger 32 secured thereto contacts with the contact member 26. The finger 32 on the contact arm 29 is of any suitable material, such as strap copper, and it is resiliently secured to the arm 29 by a suitable pin 33, which extends through suitable apertures in the arm 29 and the finger 32. A compression spring 34a is interposed between the head of the pin 33 and the face of the finger 32 for biasing it into contact with the arm 29. The end of the pin 33 opposite the head thereof is peened or a suitable washer is pressed over the end which is then peened in order to prevent axial movement of the pin under the force of the spring 34.

The lower end of the lever 29 is provided with suitable bifurcated prongs which extend outwardly therefrom to support a roller 35, made of any suitable material, by means of a pin 36 supported on opposite ends thereof by the prongs of the member 29. The pin 36 is held against axial movement by peening over or riveting the ends thereof.

The cam members 14 and 15 are so disposed with respect to the rollers 35 of the switches 25R that, when the latter engage the depressed portions 22 on their peripheral surfaces, the spring 31 biases the contact finger 32 into firm contact with the contact member 26. The spring 31 biases the arm 29 into a position such that the contact face of the finger 32 strikes the contact face of the contact member 26 and further compresses the spring 34a so that an additional compressive force is exerted on the contact finger 32 to cause it to remain in contact with the contact member 26. The electrical circuit through a switch 25R extends from bolt 24 through bracket 30, contact arm 29, pin 33, contact finger 32, contact member 26 and out by means of bolt 28.

When that portion of the peripheral surface of the cam members which is the greatest radial distance from the axis of the cam members, engages a roller 35, the lower end of the contact arm 29 is moved toward the base 27 against the force of the biasing spring 31. The corresponding movement of the upper end of the contact arm 29 is such that the contact finger 32 is moved a suitable distance from the contact surface of the contact member 26 and the circuit through the switch is thereby interrupted.

The switches RH1 to RH31 severally correspond to the contact members of a switch 25R and each is operated by an individual cam member 14 or 15. The switches 25R corresponding to switches RH1 to RH10 are disposed in a single row at regularly spaced intervals on the supporting base 27. Cam members 14, one for each of the switches RH1 to RH10, are disposed in corresponding order in coaxial relation on the shaft 17, and suitably adjusted in angular relation and tightly secured to the shaft 17, whereby the necessary sequence of operation of switches RH1 to RH10, as shown in Fig. 6, is effected.

Switches RH12 to RH31 are disposed in a single row at regularly spaced intervals on the supporting base 27 for cooperation respectively with a plurality of cam members 15. The cam members 15 are not secured directly to the shaft 17, but are provided with suitable holes 37 therein for mounting the cam members in coaxial relation on the shaft 17. A pair of spaced disc-like members 38, each provided with a suitable hub and set screw 39, are secured to the shaft 17 in spaced axial relation for the purpose of holding the cam members 15 in definite angular relation with respect to each other. Each of the cam members 15 is provided with a depression 22a in the peripheral surface thereof of substantially uniform length, and a pair of holes 40 extending transversely through the cam members somewhere along the radius thereof. These holes 40 in the cam members 15 are so relatively positioned with respect to the depression 22a in the peripheral surface of the cam member that a pin 41 which extends through the aligned holes 40 in two adjacent cam members 15, maintains a definite angular relation between the depressed portions 22a thereon, and a pin 42 which extends through the hole 40 of one of the cam members and another cam member 15 on the opposite side thereof, fixes the relative angular positions of the depressed portions 22a on those two cams. The cam members 15 at opposite ends of the entire series are secured to the corresponding members 38 by means of suitable pins engaging a hole 40 therein and a suitable hole (not shown) in the members 38. Thus the entire series of cam members 15 are secured in definite and substantially equal angular relation with respect to each other and are suitably secured to the shaft 17 to rotate in accordance with the movement of the motor RM. As shown, the angular relation between the depressed portions on successive cam members is of the order of 15 degrees.

Any suitable connection between the shaft 17 and the shaft of the motor RM may be employed, although for the purpose of simplicity and compactness, I prefer to employ a worm and worm-wheel drive with suitable couplings connecting the shaft of the motor to one of the gear members and a suitable coupling connecting the shaft 17 to the other of the gear members.

Referring back to Figs. 1 and 2, a plurality of resistances R1, R2 and R3 are connected together in series-circuit relation with each other and with the armature winding RMa of the rheostat motor RM for the purpose of controlling the speed thereof. A resistor $r$ is connected across the brush terminals of the armature winding of the rheostat motor RM for the purpose of dynamically braking the motor and effecting a quick stopping thereof when the circuit for energizing the armature winding is interrupted.

A lower limit switch LLS and an upper limit switch ULS are provided for stopping the elevator motor M when the car moves to within a predetermined distance of the terminal landing, in the event that the rheostat motor fails to operate and effect the predetermined slow down of the car thereat.

For purposes of simplicity, I have illustrated a control system embodying a car switch Cs, which is disposed on the elevator car for controlling the direction of movement of the car, although it should be understood that any other type of control system, such as a push-button type of control may be readily employed.

A plurality of suitable door-interlock switches $d$ and a gate interlock switch $g$ are provided for the purpose of insuring that the elevator system is in a proper condition for operation before permitting operation of the direction relays 1 and 2 as well as relay 6 which controls the energization of the brake release coil Bw. A plurality of safety-switches 45 for effecting further protection features in the usual manner are also provided.

Any suitable stopping control means may be provided, but I prefer to employ a plurality of stopping inductor relays 1R, 2R, 3R and 4R having energizing windings 1L, 2L, 3L and 4L, respectively. These inductor relays are preferably of the type described in my above-mentioned copending application, of which George K. Hearn is co-inventor.

It is, therefore, deemed unecessary to describe the specific kind of inductor relay shown in Fig. 2, but a brief explanation of the nature and function thereof is deemed advisable to render the operation of the entire control system more clear.

Taking relay 4R as an example, it comprises essentially a magnetic core portion 46 of H-shape with the energizing winding 4L coiled around the core portion. A pair of normally closed contact members 4UL are normally in a closed or contacting position for completing a circuit therethrough. One of the contact members 4UL is pivotally mounted by means of a suitable arm 47, and is movable with respect to the other contact member 4UL which is stationarily supported.

Another pair of contact members 4DL, similar to contact members 4UL, are also provided, and in a similar manner, one of the contact members is movable with respect to the other, which is stationarily mounted.

Referring to Fig. 7, inductor relays IR, 2R, 3R and 4R are suitably mounted in horizontal alignment and in spaced relation on the exterior of the elevator car C. A plurality of groups of inductor plates, of suitable magnetic material, are disposed stationarily in the hatchway, each plate of each group being disposed in a predetermined position with respect to one of the floors to which it corresponds. A complete set of plates for one floor is shown in Fig. 7, and comprises the plates IU, 2U, 3U, 4U, ID, 2D, 3D and 4D, the plate members having designations employing the suffix U being effective for upward movement of the elevator car, and the plate members having designations employing the suffix D being effective for downward movement of the elevator car.

The plate members IU and ID are disposed substantially in a position corresponding to the position of the floor in the elevator car when it is in alignment with a floor. The plate members 2U, 3U and 4U are spaced successively at suitable increasing distances below the plate member IU, and plate members 2D, 3D and 4D are successively spaced at suitable increasing distances above the plate member ID. The plate members IU, ID, 2U, 2D, etc., are laterally spaced in accordance with the lateral spacing between the inductor relays IR, 2R, etc., on the elevator car.

During the movement of the elevator car past the inductor plates in an upward direction, the inductor relays 4R, 3R, 2R and IR successively cooperate with the plates 4U, 3U, 2U and IU to effect the slow down and stopping of the elevator car, as will be hereinafter explained in greater detail. When the elevator car moves downwardly, the relays 4R, 3R, 2R and IR successively cooperate with the plates 4D, 3D, 2D and ID to effect the same function.

The inductor relays are severally so oriented on the elevator car that the plates 4U, 3U, 2U and IU come into closely adjacent relation to corresponding ends of the legs of the H-shaped magnetic core portion of their corresponding relays in passing them. The control system is so adapted that the energizing coils of the inductor relays are energized prior to a car passing a plate member. When a plate member, such as 4U, comes into closely adjacent relation with the magnetic core portion of H-shape on inductor relay 4R, the reluctance of the magnetic path extending between the ends of the legs on one side is greatly reduced, and a magnetic attraction is thus exerted on the pivoted arm 47 supporting one of the contact members 4UL due to the large increase in flux threading the core portion of H-shape, which results in the separation of the contact members 4UL.

The contact members 4UL remain separated until the energizing winding 4L is deenergized, because the magnetism in the magnetic core exerts a sufficient force to prevent the biasing means from returning the pivoted arm to its original position until the energizing winding 4L is deenergized. When winding 4L is deenergized, the residual magnetism in the core cannot overcome the force of the biasing means and the contact members are thus closed.

Similarly, when plate 4D comes into closely adjacent relation with the ends of the legs of the H-shaped core on the side opposite to that of the ends with which the plate 4U cooperates, the contact members 4DL are caused to separate in the manner described for contact members 4UL.

Similarly, the contact members 3UL and 3DL are selectively controlled by movement of the relay 3R past plates 3U and 3D, respectively, contact members 2UL and 2DL are selectively controlled by movement of relay 2R past plate members 2U and 2D, respectively, and contact members IUL and IDL are controlled, respectively, by movement of relay IR past plate members IU and ID.

Fig. 6 is a diagram illustrating the sequence of operation of the switches RHI to RH3I, which are operated by the motor RM through the medium of the operating cams 14 and 15. It should be understood that Fig. 6 is a diagram showing the particular position of any of the switches RHI to RH3I at any time during the operation of the rheostat motor RM. The shaded portions of the horizontal divisions represent the fact that a switch is closed, and the unshaded portions thereof represent the fact that a switch is open.

A particular time is represented by the travel of the cam members, constituting the operating drum, in mechanical degrees of angular movement with respect to an initial standing or starting position corresponding to that when the elevator car is stopped at any particular floor. For example, at the time that an elevator car is standing at a floor, Fig. 6 shows clearly that contact members or switches RH1, RH2, RH5, RH7 and RH8 are closed, while all the rest of the switches are open.

It should be clear that Fig. 6 does not represent a developed plan view of the cam surfaces of the cam members constituting the operating drum. Fig. 6 is a chronological chart and purely diagrammatic in character. Fig. 6 will be referred to again during the subsequent explanation of the operation of my invention, and it is thought, therefore, that the above explanation of its significance will suffice for the present.

The operation of my invention may best be understood by an assumed operation. Let it be supposed that the elevator car C is standing at a floor, for example, the lower terminal floor, and that the operator desires to move it to another floor, such as the tenth floor. He then closes the elevator gate and hatchway door and moves the handle of the car switch Cs in a clockwise direction from its neutral or center position.

The closing of the hatchway door-interlock switch d completes a circuit for energizing the coil of a relay 42, which circuit extends from supply conductor LI through conductors 50 and 51, coil of relay 42, conductor 52, all of the door interlock switches d in series, and conductor 53 to supply conductor L2. The closing of the gate switch g completes a circuit for energizing the coil of a relay 40, which circuit extends from supply conductor L1 through conductor 50, coil of relay 40, conductor 54, gate switch g, and conductor 56 to supply conductor L2.

The operation of the car switch Cs in a clockwise direction completes a circuit for energizing the coil of a relay 80U, which circuit extends from supply conductor L1 through conductor 57, switch RH1, conductors 58 and 59, normally closed contact members b of a relay 80D, conductor 60, coil of relay 80U, conductor 61, contact finger 62, conducting segment 63 of car switch Cs, contact finger 64, and conductors 65 and 66 to supply conductor L2.

The energization of relay 80U closes the normally opened contact members c thereof, and thereby establishes a holding circuit in parallel with switch RH1 for maintaining the relay 80U energized, regardless of the condition of switch RH1.

The closing of normally opened contact members a of relay 80U completes a circuit for energizing the coil of a relay 25, which circuit extends from supply conductor L1 in parallel through switch RH1 and contact members c of relay 80U, through conductors 58 and 67, coil of relay 25, conductor 68, contact members a of relay 80U and conductors 69 and 66 to supply conductor L2.

The closing of normally opened contact members d of relay 80U completes a circuit for energizing the coils of relays 1 and 6, which circuit extends from supply conductor L1 through conductor 70, safety switches 45 in series, conductor 72, contact members of relays 42 and 40 in series, conductor 73, coil of relay 6, conductor 74, contact members d of relay 80U, conductors 75 and 76, coil of relay 1, conductor 77, contact members 1UL of inductor relay 1R, conductors 78 and 79, switch RH7 and normally opened contact members c of relay 25 in parallel, and conductors 80 and 81 to supply conductor L2.

The normally opened contact members d of relay 1 are connected in parallel with contact members d of relay 80U, and thus when the former are closed, upon the energization of relay 1, a holding circuit, for maintaining relays 1 and 6 energized independently of the condition of the contact members d of relay 80U, is established thereby.

Another holding circuit in parallel relation to the parallel-connected switch RH7 and contact members c of relay 25 is established by the closing of normally opened contact members e of relay 1, which circuit includes the contact members e of relay 1 and the upper limit switch ULS in series-circuit relation. A similar holding circuit connected in parallel relation with switch RH7 and contact members c of relay 25 comprises the lower limit switch LLS and contact members e of relay 2 in series-circuit relation. These latter two holding circuits are connected at points between the direction relay contact members and the limit switches so that the two limit switches themselves are connected in series-circuit relation to comprise a holding circuit in parallel-circuit relation to switch RH7 and contact members c of relay 25.

The closing of normally opened contact members a of relay 1 and the closing of the normally opened contact members a of relay 6 completes a circuit for energizing the brake release coil Bw, which circuit extends (see top of Fig. 1) from supply conductor L1, through conductors 82 and 83, contact members a of relay 1, conductors 84 and 85, contact members a of relay 6, conductor 86, brake coil Bw, and conductor 87 to supply conductor L2.

The closing of contact members a of relay 1 also completes a circuit for energizing the coil of a relay 34, which circuit extends from supply conductor L1 through conductors 82 and 83, contact members a of relay 1, conductors 84 and 85, coil of relay 34, and conductors 88 and 89 to supply conductor L2. Contact members a of relay 1, when closed, also partially complete a circuit for energizing the coil of a relay 55, which circuit will be traced in detail hereinafter.

The closing of the normally opened contact members b and c of relay 1, upon the energization of relay 1, completes a circuit for impressing a potential across the rheostat or resistance potentiometer P, which, as will be hereinafter explained, effects the initial energization of the shunt-field winding GF of generator G. The circuit for impressing a potential on the rheostat P extends from supply conductor L1 through conductor 90 (see bottom of Fig. 1), contact members c of relay 1, conductor 91, rheostat P, conductors 92 and 93, contact members b of relay 1, and conductor 89 to supply conductor L2.

By referring to Fig. 6, it will be observed that switch RH2 is closed when the elevator car is standing at the floor, thus a circuit for impressing an initial potential on the shunt-field winding GF exists, which circuit extends from the tap connection 94 on the resistance element of the rheostat through conductor 95, switch RH2, conductors 96, 97, 98, 99 and 100, shunt-field winding GF, conductor 101, normally closed contact members e of a relay GR5, conductors 102 and 103, normally closed contact members b of a relay GR3 to a tap connection 104 on the resistance potentiometer CR, thence through a portion of the potentiometer CR and conductors 105, 106 and 107 to the end of the portion of the rheostat resistance element opposite the tap connection 94. Thus a predetermined potential, namely, that between the tap connection 94 and supply conductor L1, is impressed across the shunt-field winding GF.

It will be understood that at this time the regulating generator RG is being operated by the motor Rm at a constant speed.

The energization of the shunt-field winding GF of the generator G sets up a magnetic field flux in the generator G, and the generator thus begins to build up voltage until sufficient voltage is generated to supply the armature winding Ma of the motor M with sufficient current that the necessary torque is exerted to move the elevator car in an upward direction at a slow speed.

The closing of contact members c of relay 34, upon the energization of relay 34, as previously described, completes the necessary circuits for energizing the coils of relays GR3 and GR4. The circuit for energizing the coil of relay GR3 extends from supply conductor L1 (see middle of Fig. 2) through conductor 108, contact members c of relay 34, conductor 109, coil of relay GR3, conductor 110, contact members 2UL and 2DL of inductor relay 2R, in series, and conductor 111 to supply conductor L2.

The circuit for energizing the coil of relay GR4 extends from supply conductor L1 (Fig. 2), through conductor 108, contact members c of relay 34, conductors 109, 112 and 113, coil of relay GR4, conductor 114, contact members f of relay 1, conductor 115, contact members 3UL of inductor relay 3R, and conductor 116 to supply conductor L2.

The closing of normally opened contact members a of relay 34 completes a circuit for energizing the rheostat adjusting motor RM, which circuit extends from supply conductor L1 (see bottom of Fig. 1), through conductor 117, contact members a of relay 34, conductor 118, contact members b of relay 25, and conductor 119 to the point 120; thence through two parallel branches, the one branch extending through conductors 121, 122 and 123, switch RH5, conductor 124, resistor R1, conductor 125, normally closed contact members d of relay 55, conductor 126, resistor R3, conductor 127, armature winding RMa of rheostat motor RM, and conductor 128 to the point 129, while the other branch extends from the point 120 through conductor 130, shunt-field winding RMF of the motor RM, and conductor 131 to the point 129, from whence the circuit extends through conductor 132 to supply conductor L2.

It will be observed that the resistor R2 is shunted by contact members d of relay 55, and the circuit above traced thus makes clear the fact that the resistor R2 is ineffective to limit the current in the armature winding of the motor RM at this time, and that resistors R1 and R3 only are effective for that purpose.

As a result of the energization of both the armature winding RMa and the shunt-field winding RMF of the motor RM, the latter is actuated to rotate in a predetermined direction such as to cause a rotation of the operating drum comprising the cam members 14 and 15.

As will be observed from Fig. 6, switch RH9 closes after a rotational movement of the rotating drum, amounting to about 7½ mechanical degrees. The closing of switch RH9 is, however, without immediate effect at this time because it only partially completes a parallel-circuit connection around contact members a of relay 34 and contact members b of relay 25.

Switch RH3 is the next switch to close during the sequence of operation, and its closing occurs after substantially 15 mechanical degrees of movement of the operating drum.

The closing of switch RH3 completes a shunting circuit between the tap connection 94 on the resistance element of rheostat P and a tap connection 133 at a higher potential than the tap connection 94. The effective voltage between the tap connection 94 and supply conductor L1 is thus proportionately augmented, and the degree of energization of the shunt-field winding GF of the generator G increases, with the result that the generator G supplies a greater voltage to the brush terminals of the motor M and the elevator car is, therefore, accelerated to a greater speed.

After a slight increment of angular movement of the operating drum, amounting to about 7 degrees, switch RH10 closes, but the closing thereof is effective only to complete a parallel circuit, including switches RH8, RH9 and itself, around contact members a of relay 34 and contact members b of relay 25. Thus the closing of switch RH10 is without immediate effect at this time.

After another slight increment of angular movement of the operating drum, switch RH2 opens and at this time the total extent of angular movement of the operating drum is slightly less than 30 degrees.

The opening of switch RH2 removes the shunt connection around the portion of the resistance element of rheostat P between the tap connections 94 and 133 and, therefore, the total voltage between the tap connection 133 and supply conductor L1 is effective to further increase the degree of energization of the shunt-field winding GF. The generator G thus supplies a higher voltage to the motor M, which, as a result, accelerates to a higher speed and causes the car to accelerate accordingly.

When the operating drum attains a total angular movement of approximately 37 degrees, switch RH1 opens, but, since contact members c of relay 8OU (now closed) are connected in parallel relation thereto, the opening of switch RH1 is without effect.

When the operating drum reaches a total angular displacement of between 50 and 60 degrees, switches RH3, RH5 and RH7 are all simultaneously opened, while switches RH6 and RH12 are simultaneously closed.

The opening of switch RH7 is without effect, since the contact members c of relay 25 in parallel relation thereto remains closed, and since the circuit through contact members e of relay 1, and upper limit switch ULS also in parallel relation thereto, remains closed.

The closing of switch RH6 completes a circuit for energizing the coil of a relay GR6, which circuit extends from supply conductor L1 (Fig. 2) through conductor 108, contact members c of relay 34, conductors 109, 112 and 134, contact members e of relay 25, conductor 135, coil of relay GR6, conductor 136, switch RH6, conductor 137, contact members g of relay 1 conductor 138, contact members 4UL of inductor relay 4R, and conductor 139 to supply conductor L2.

The normally opened contact members g of relay GR6 are connected in parallel-circuit relation to contact members e of relay 25, and thus, when closed, establish a self-holding circuit for the coil of relay GR6.

Switch RH12 closes slightly before switch RH3 opens, and thus for an instant the voltage between tap connection 133 on the resistance element of the rheostat P and supply conductor L1 is proportionately increased, which results in a higher degree of energization of the shunt-field winding GF of the generator G and a further acceleration in the speed of movement of the elevator car. When switch RH3 opens, the full voltage between a tap connection 140 on the resistance element of the rheostat P and supply conductor L1 is effective to energize the generator shunt-field winding GF, and the elevator car is thus caused to accelerate to a still higher speed.

When relay GR6 is energized, as previously described, its normally opened contact members b close to complete a shunt-circuit connection around a portion of the resistance element of the rheostat P between the tap connection 140 and a tap connection 141, the potential of which with respect to supply conductor L1 is almost equal to the full voltage between supply conductors L1 and L2. The total voltage effective to energize the shunt-field winding GF of generator G is thus again increased and the elevator motor is thereby caused to drive the elevator car at a maximum speed for the particular control system employed.

It should be understood that at the time the relay GR3 is energized, normally opened contact members a thereof are closed and normally closed contact members b thereof are opened to change the tap connection from the point 104 on the potentiometer resistor CR to the point 142. The possible voltage effect of the regulating generator RG in the circuit of the generator shunt-field winding GF is thus increased. When normally opened contact members $d$ and normally closed contact members $e$ of relay GR6 closed and opened, respectively, in response to the energization of the relay, the armature winding of the regulating generator was connected directly in series-circuit relation with the generator shunt-field winding GF whereby the full voltage effect thereof is attained.

It should further be understood that the regulating generator RG functions during the entire acceleration cycle to cause the elevator motor to drive the elevator car in a manner to conform closely to a predetermined acceleration curve by interposing a voltage in the excitation circuit of the shunt-field winding GF proportioned to the difference between the actual speed of the elevator motor and a predetermined speed desired therefor. The regulating generator is caused to function in this manner, as described in detail in the copending application above-mentioned, of which George K. Hearn is co-inventor, and it is, therefore, deemed unnecessary to explain the operation of the regulating generator in detail, since the theory of operation may be understood by referring to the copending application.

However, it may be briefly explained that whenever a difference in potential occurs between the tap connection 143 on the potentiometer resistor PR and the tap connection 144 on the potentiometer resistor PM, the "differential" shunt-field winding RGF of the regulating generator RG is energized in accordance with the degree and polarity of the voltage difference. The series field winding RSF of the generator RG is energized in accordance with the direction and amount of current flowing in the loop circuit connecting the armature windings of the generator G and motor M. The magnetomotive force effective to set up a magnetic field in the generator RG is thus measured by the algebraic sum of the magnetomotive forces set up by the two field windings RGF and RSF. The voltage generated by the regulating generator is thus proportioned to the degree of difference between the voltage supplied to the generator shunt field winding GF from rheostat P and the counter-electromotive force generated in the armature winding of the motor M$a$. Thus, when the potential supplied to the generator shunt-field winding GF from the rheostat P was increased during acceleration, the momentary potential at the tap connection 143 was higher than the momentary potential at the tap connection 144. Due to the momentary increase in voltage applied to the brush terminals of the motor M during each step of acceleration, and due to the inherent inertia of the elevator car, the elevator counterweight and the armature of the elevator motor M itself, the current flowing through the armature winding M$a$ of the motor momentarily increases because the counter-electromotive force generated by the motor remains momentarily unchanged as a result of the unchanged momentary speed of the motor. Due to the momentary increase in current through the loop circuit connecting the armature windings of motor M and generator G, the magneto-motive force exerted by the series-field winding RSF of the regulating generator RG increases in proportion. Similarly, due to the inherent delay in the building-up of the generator voltage, the winding RGF produces a magneto-motive force tending to increase the generator voltage.

In the case assumed, the magnetomotive forces produced by winding RGF and RSF are additive and, the voltage generated by the regulating generator RG is in a direction to aid the voltage supplied to the shunt-field winding GF from the rheostat P. The voltage generated by the generator G is thus momentarily increased to such an extent as to cause the motor M to quickly respond to the increase in speed desired, as determined by the change in voltage supplied from the rheostat.

Substantially at the time that switch RH6 closed to effect the energization of relay GR6, switch RH5 opened, and thus the circuit, previously traced, for energizing the armature winding RM$a$ of the rheostat motor RM and the shunt-field winding RMF thereof, was interrupted thereby effecting the stopping of the rheostat motor.

As will be observed in Fig. 6, the acceleration of the elevator car was effected while the operating drum of the rheostat P rotated through approximately 60 degrees.

As will be further noted, in Fig. 1 switches RH12 and RH13 are connected in parallel-circuit relation. This is for the purpose of maintaining the connection to the tap point 140 in the event that the rheostat motor should coast slightly to such an extent, after stopping, as to effect the opening of switch RH12. Switch RH13 closes slightly before switch RH12 opens and thus, although the latter opens, the former maintains the connection to tap point 140.

The energization of relay GR6, as previously described, causes the normally opened contact members $a$ thereof to close, and thereby complete a circuit for energizing the coil of relay 55. This circuit extends from supply conductor L1 (see top of Fig. 1) through conductors 82 and 83, contact members $a$ of relay 1, conductors 84 and 85, coil of relay 55, conductor 145, contact members $a$ of relay GR6 and conductors 146, 88 and 89 to supply conductor L2.

The normally opened contact members $a$ of relay 55 are connected in parallel-circuit relation to the contact members $a$ of relay GR6, and thus when closed, established a self-holding circuit for relay 55. It will be observed that this holding circuit remains complete until the opening of contact members $a$ of relay 1, which occurs at the termination of the stopping operation.

Normally opened contact members $b$ and normally closed contact members $c$ of relay 55, when closed and opened, respectively, by the energization of the relay, increase the amount of the resistance element of the rheostat P which is short-circuited. In other words the portion of the resistance element of rheostat P between tap connections 140$x$ and 140$z$ is short-circuited by the closing of contact members $b$ of relay 55 whereas a smaller amount of the resistance element between tap connections 140$x$ and 140$y$ are short-circuited when contact members $c$ of relay 55 were closed.

The short-circuiting of an increased amount of the resistance element of rheostat P tends to increase proportionately the voltage applied to the remainder of the resistance element of the rheostat P. However, the portion of the resistance element of rheostat P between tap connections 140 and 141, which includes that between tap connection 140$x$ and either of the tap connections 140$y$ or 140$z$, is short-circuited when contact members b of relay GR6 close upon the energization thereof. Accordingly, closure of contact members b and opening of contact members c, of relay 55, does not vary the value of voltage applied to field winding GF.

When contact members of relay GR6 open, however, to initiate the decelerating operation, the voltage of tap connection 140 is determined by tap connection 140z. The latter tap connection is preferably adjustable, in order that the excitation of winding GF, following the opening of relay GR6, may be varied to accommodate the operating characteristics of particular driving mechanisms. The opening of contact members d of relay 55 reinserts resistor R2 into the circuit of rheostat motor armature RMa. This operation is without immediate effect, however, since this circuit is interrupted at rheostat switch RH5.

The operator continues to hold the car switch Cs in a position to connect contact fingers 62 and 64, as long as he desires to keep the elevator car moving at the operating speed. When the elevator car reaches the proper distance from the floor at which the operator desires the car to stop, assumed to be floor 10, he "centers" the handle of the car switch Cs, that is, he returns it to its central position, so that the connection between contact fingers 62 and 64 is interrupted. The centering of the car switch thus interrupts the circuit, previously traced, for energizing the coil of relay 80U, and the deenergization of relay 80U is thereby effected.

The opening of contact members a and c of relay 80U interrupts the circuit previously traced therethrough for energizing the coil of relay 25, and relay 25 is thus deenergized. Contact members d of relay 25, when closed by the deenergization of that relay, complete a circuit for energizing the coil 4L of inductor relay 4R, which circuit extends from supply conductor L1 (Fig. 2) through conductor 108, contact members c of relay 34, conductors 109, 112, and 147, contact members d of relay 25, conductors 148 and 149, coil 4L, and conductor 150 to supply conductor L2.

The energization of coil 4L should be effected before inductor relay 4R comes in close proximity to inductor plate 4U, or otherwise the stopping of the elevator car will not be effected for the floor corresponding to that inductor plate, but the car will proceed to the next "up" inductor plate 4U corresponding to the next floor or landing. It is assumed, however, that the operator centered his car switch in the proper manner and at the proper time, so that the coil 4L of inductor 4R was energized before inductor relay 4R came into close proximity to inductor plate 4U.

As previously described, when the inductor plate 4U comes into close proximity to the magnetic core portion of H-shape of relay 4R, the contact members 4UL are actuated to an open position. Thus, in this case, contact members 4UL are opened, and thereby effect the interruption of the circuit previously traced for energizing the coil of relay GR6. The opening of contact members b of relay GR6 transfers the tap connection of the resistance element of the rheostat P to the point 140, and thus the voltage supplied from the rheostat to the generator shunt-field GF is reduced, whereby a reduction in the speed of the elevator car occurs.

Contact members c of relay GR6 reclose, upon the deenergization of the relay, to connect the protective resistance Br in shunt-circuit relation to the generator shunt-field winding GF.

Contact members f of relay GR6, when reclosed by the deenergization of the relay, complete a circuit for energizing the coil 3L of inductor relay 3R, which circuit extends from supply conductor L1 (Fig. 2) through conductor 108, contact members c of relay 34, conductors 109, 112 and 147, contact members d of relay 25, conductor 148, contact members f of relay GR6, conductor 152, coil 3L of relay 3R, and conductor 153 to supply conductor L2.

The elevator car continues to decelerate until inductor relay 3R comes into cooperative relation with its corresponding plate member 3U, at which time contact members 3UL of relay 3R are thereby actuated to an open position to interrupt the circuit previously traced for energizing the coil of relay GR4. Contact members a and b of relay GR4 reclose, therefore, as a result of the deenergization of relay GR4. Contact members b of relay GR4, when closed, complete a circuit for energizing the coils 2L and 1L of inductor relays 2R and 1R, respectively, which circuit extends from supply conductor L1 (Fig. 2) through conductor 108, contact members c of relay 34, conductors 109, 112 and 147, contact members d of relay 25, conductors 148 and 154, contact members b of relay GR4 and conductor 155 to the point 156; thence the circuit divides into two branches, one extending through conductor 157, coil 2L of relay 2R and conductor 158 to supply conductor L2, while the other extends from the point 156 through conductor 159, coil 1L of relay 1R, and conductor 160 to supply conductor L2.

Although I have illustrated two separate inductor relays 2R and 1R, it should be understood that a single relay may be employed having two pairs of contact members corresponding to the contact members 1UL, 1DL, 2UL and 2DL, but provided with only one energizing coil whereby all of the contact members may be selectively actuated when the relay comes into close proximity to the proper inductor plate.

The reclosing of contact members a of relay GR4, as a result of the deenergization of the relay, completes a circuit for energizing the armature winding RHa of the rheostat operating motor RM, which circuit extends from supply conductor L1 (see bottom of Fig. 1), through conductors 161 and 162, rheostat switch RH8, conductor 163 to the point 164; thence the circuit extends through conductor 165, rheostat switch RH9, conductor 166, rheostat switch RH10, conductor 121 to the point 167, whence it extends through conductor 122, contact members a of relay 25, conductor 168, contact members a of relay GR4, conductor 169, resistor R2 (not shunted by contact members d of relay 55 at this time because these contact members are in an open position), resistor R3, conductor 127, armature winding RMa of rheostat motor RM and conductors 128 and 132 to supply conductor L2. It should be noted that the shunt-field winding RMF is continuously energized while the elevator car is operating at a steady running speed, since rheostat switches RH8, RH9 and RH10 continuously complete a circuit for energizing the shunt-field winding RMF. This circuit extends from supply conductor L1 (Fig. 1) to the point 167, as just previously traced for the armature winding of the rheostat motor RM, thence through conductors 121 and 130, shunt-field winding RMF and conductors 131 and 132 to supply conductor L2.

Thus, the effect of the deenergization of relay GR4 is to start the rheostat motor RM, which rotates in the same direction as it rotated during the acceleration cycle. The cam members constituting the operating drum, after a slight angular rotational movement, effect the opening of switch RH12 and the closing of switch RH13, switch RH13 being closed slightly before switch RH12 opens. This, as previously noted, does not effect any change in the excitation of the generator shunt-field winding GF because switches RH12 and RH13 are in parallel-circuit relation and connected to the same tap connection 140 on the resistance element of the rheostat P.

After a further rotational movement of the operating cam members, switches RH5 and RH7 are closed and switch RH6 is opened, simultaneously.

The opening of switch RH6 is without effect at this time because the circuit for energizing the coil of relay GR6, in which it is connected has already been interrupted by the opening of contact members 4UL of inductor relay 4R.

The closing of switch RH7 is without immediate effect because the energizing circuit for relays 1 and 6 is maintained by the two limit switches LLS and ULS connected in series with each other and in parallel circuit relation with switch RH7. However, switch RH7 is effective to maintain the circuit for energizing relays 1 and 6 to thereby keep the elevator car moving in the event that the elevator car approaches within the upper or lower terminal limits defined, respectively, by the upper limit switch ULS and the lower limit switch LLS, because switch RH7 remains closed, as will be observed from Fig. 6, for the remaining duration of the deceleration cycle. Thus, although either of the limit switches opens when the elevator car comes within the upper or lower terminal limits, the elevator car is maintained in motion due to the effect of switch RH7.

It should be noted at this point that, if for some reason, the rheostat motor RM does not start in response to the deenergization of relay GR4 when the elevator car is approaching the terminal floors, the proper limit switch ULS or LLS is operated to interrupt the energizing circuit for the direction relay 1 and the brake relay 6, whereby the elevator car is stopped and the brake applied.

The closing of switch RH5 is without effect at this time, because it merely connects resistor R1 in parallel-circuit relation with contact members $a$ of relay 25 and contact members $a$ of relay GR4, which contact members of each relay are closed to maintain the energizing circuit for the armature winding of the rheostat motor RM.

The subsequent movement of the cam members is such as to successively close and open switches RH13 to RH28, whereby the potential supplied from the rheostat P for energizing the shunt-field winding GF of the generator G is reduced in a comparatively large number of small steps or increments of voltage change. As will be observed in Fig. 6, switches RH13 to RH28 are closed for an interval of time corresponding to approximately 15 mechanical degrees of rotation of the cam members constituting the rheostat operating drum, and that each succeeding switch is closed slightly before the preceding switch is opened.

At substantially the same time that switch RH28 is closed, switch RH8 is opened. The opening of switch RH8 interrupts the circuit for energizing the armature winding RMa and the shunt-field winding RMF of the rheostat motor RM, and the rheostat motor, therefore, immediately stops in a position with switches RH28, RH10, RH9, RH7 and RH5 closed, all of the other rheostat control switches being opened.

The sequence of operation of the rheostat switches RH13 to RH28 is so designed, therefore, that the energization of the generator shunt-field winding GF cannot be decreased below a predetermined amount before the inductor relay 2R on the elevator car passes its corresponding inductor plate 2U in the hatchway.

It is assumed in the present operation, however, that the inductor relay 2R on the elevator car reaches the inductor plate 2U at substantially the same time or slightly after the switch RH28 is closed and the switch RH8 is opened.

Immediately upon the relay 2R reaching the plate 2U, the contact members 2UL of relay 2R are opened in the manner previously described for relay 4R, and thus the circuit for energizing the coil of relay GR3 is interrupted thereby.

The elevator car, at this time, is within a foot of the floor landing, and thus in order to speed up the operation of the elevator system, the closing of contact members $d$ of relay GR3, as a result of the deenergization of the relay, completes a parallel-circuit connection around the contact members of gate interlock relay 40 including contact members $b$ of relay 34, which are closed, and thus the opening of the elevator car gate may be effected without immediately interrupting the circuit for energizing the direction relay 1 and the brake relay 6.

The reclosing of contact members $c$ of relay GR3, as a result of the deenergization of the relay, completes the circuit for energizing the armature winding RMa and the shunt-field winding RMF of the rheostat motor RM, just previously interrupted by the opening of switch RH8. Contact members $c$ of relay GR3 are in parallel-circuit relation to switch RH8, and the circuit completed by the closing of contact members $c$ is thus substantially the same as that previously traced when switch RH8 was closed.

The rheostat motor is, therefore, again actuated to start rotating the cam members constituting the operating drum of the rheostat P.

The initial slight angular movement of the rheostat operating drum effects the opening of switch RH28 and the closing of switch RH29 substantially simultaneously, and the voltage applied from the rheostat P to the generator shunt-field winding GF is thereby reduced to a further degree to further decelerate the elevator car.

While switch RH29 is closed, the rotation of the operating drum effects the closing of switch RH8. However, because switch RH8 merely closes a parallel-circuit connection around the contact members $c$ of relay GR3, no immediate effect results from the closing of switch RH8.

Further rotation of the operating drum by the motor RM effects the opening of switch RH29 and the closing of switch RH30, at substantially the same time, to thereby further reduce the voltage supplied from the rheostat P to the generator shunt-field winding GF and thus effect a further deceleration of the elevator car.

As the operating drum continues to rotate further, the switch RH9 and the switch RH30 are opened, while the switch RH31 is closed at substantially the same time.

The opening of switch RH9 interrupts the circuit, previously traced, for energizing the armature winding RMa and the shunt-field winding RMF of the rheostat motor RM, and the motor RM is thus immediately stopped.

By this time the inductor relay IR on the elevator car has reached its corresponding plate member IU, and contact members IUL are, therefore, actuated to an open position to interrupt the circuit, previously traced, for energizing the coils of relays I and 6.

The opening of contact members b and c of relay I, as a result of the deenergization of the relay, disconnects the resistance element of the rheostat P from the supply conductors LI and L2, and the generator shunt-field winding GF is, therefore, completely deenergized to cause the motor M to stop the car in exact alignment with the floor level.

The opening of contact members a of relay I, as a result of the deenergization of the relay, interrupts the separate circuits previously traced for energizing the coils of relays 34 and 55, respectively, and these relays are, therefore, deenergized.

The opening of contact members c of relay 34, as a result of the deenergization of the relay, interrupts the circuits previously traced for energizing the coils IL, 2L, 3L and 4L of inductor relays IR, 2R, 3R and 4R, respectively.

The opening of contact members a of relay I and the opening of contact members a of relay 6, interrupts the circuit, previously traced, for energizing the brake release coil Bw, and thus the brake shoe Bs is biased into frictional engagement with the brake drum Bd to effectively maintain the floor of the elevator car in exact alignment with the floor level.

The reclosing of contact members b of relay 6, as a result of the deenergization of the relay, establishes a parallel-circuit connection around the switch RH9, and the circuit substantially as previously traced, for energizing the armature winding RMa and the shunt-field winding RMF of the rheostat motor RM, is reestablished. Contact members d of relay 55 have, however, reclosed as a result of the immediately previous deenergization of relay 55, and thus resistor R2 is short-circuited thereby. Since resistor RI is also short circuited, due to the fact that the switch RH5 in series-circuit relation therewith, and that contact members a of relay 25 and contact members of relay GR4 are all closed at this time, resistor R3 alone is effective to limit the current through the armature winding RMa. Thus the motor RM rotates at a slightly higher speed than during deceleration due to the increased torque created by the increased current in the armature winding RMa thereof. The motor rotates the operating drum through the remaining angle to return it to the original position it occupied at the time of the initiating of the starting operation. During this last or resetting movement of the operating drum, switches RHI and RH2 are closed, while switches RH3I and RH10 are opened.

The opening of switch RH3I is without effect, but the opening of switch RH10 interrupts the energizing circuit for the rheostat motor RM previously completed by the reclosing of contact members b of relay 6, and thereby effects the final stopping of the rheostat motor. When the rheostat motor comes to a complete stop, the operating drum is again in the initial position ready for the next starting operation.

It should be understood that the regulating generator RG was effective to cause the elevator motor to quickly respond to the change in speed desired, as controlled by the large number of successive incremental decreases in voltage supplied to the generator shunt-field winding GF from the rheostat P. Due to the fact that a comparatively large number of steps or increments of voltage change were made during the deceleration cycle, the operation of the regulating generator RG was effective to cause the elevator motor to conform closely to the desired speed change characteristic without any sudden changes in speed occurring.

The above operation is typical of runs of the elevator car between two floors which are spaced a distance apart more than that between two successive floors. In the event that the operator of the elevator car desires to make a so-called "one-floor-run", that is, move the elevator from one floor to a next succeeding floor, the control system is effective to prevent the elevator motor attaining the high or maximum speed attained for a run of a greater distance.

As will be remembered from the explanation of the sequence of operations previously given in connection with the acceleration of the elevator car to the highest speed, the relay GR6 is energized when the rheostat switch RH6 is closed during the operation of the rheostat motor RM. In order that the coil of relay GR6 may be energized, it is necessary that contact members e of relay 25 be previously closed in order that the circuit for energizing the coil be completed when switch RH6 closes. In accelerating the elevator car to the highest speed, the handle of the car switch Cs is held in its displaced position by the elevator operator, and, therefore, the circuit for energizing the coil of relay 25 is maintained closed because contact members a and c of either relay 80U or 80D are closed due to the fact that either one of these relays are energized, depending upon the direction of displacement of the handle of the car switch to effect upward or downward movement of the elevator car.

When the operator desires to make a so-called "one-floor" run, he must center the car switch handle at a time which occurs before the operating drum of the rheostat P has rotated a sufficient distance to close switch RH6. Therefore, depending upon which direction the car is moving, either relay 80U or relay 80D is deenergized to effect the deenergization of relay 25. Thus contact members e of relay 25 are opened before switch RH6 closes, and as a result, the coil of relay GR6 cannot be energized and the elevator car cannot, therefore, attain the highest speed but can only travel at an intermediate speed.

Because relay GR6 is not energized during a "one-floor" run, relay 55 is not energized, because the energizing circuit for the coil of relay 55 is completed only when the contact members a of relay GR6 are closed upon energization thereof.

Since relay 55 remains deenergized, contact members b and c thereof remain in the illustrated positions. Accordingly, in operating the car at intermediate speed on a "one-floor" run, the voltage of tap connection 140 is determined by tap connection 140y. It will be recalled that, following the opening of relay GR6, to decelerate the car from highest speed to intermediate speed, the voltage of tap connection 140 is determined by tap connection 140z. It has been found, in practice, that a different generator excitation is required when deceleration is initiated from intermediate speed than when initiated from highest speed and the use of two independently controlled tap connections 140y and 140z constitutes a convenient method of obtaining independent adjustments to accommodate the two operating conditions. In the illustrated embodiment, the adjustable taps 140y and 140z are such that closure of relay 55 causes an increase in the voltage at tap connection 140. Depending upon the characteristics of the particular system, the increment of voltage change caused by operation of relay 55 may be increased or decreased and, in some cases, reversed.

Due to the fact that contact members d of relay 55 do not open during the one-floor run, the resistor R2 in series with the armature winding RMa of the motor RM remains short circuited. Therefore, since rheostat switch RH5 is closed during the acceleration cycle, as shown in Fig. 6, the energizing circuit for the armature winding RMa of rheostat motor RM includes the resistors R1 and R3 but not resistor R2. It will thus be seen that, since the same resistances are included in series-circuit relation with the armature winding RMa of the rheostat motor during a one-floor run as for a run of greater extent, the rheostat motor operates at the same speed during the accelerating cycle in either case. As will be recalled from the previous explanation of the acceleration of the elevator car to the highest speed, resistor R2 remains short-circuited during the acceleration cycle because contact members d of relay 55 do not open in response to the energization of the relay until the highest speed of operation is attained. Thus resistors R1 and R3 only are included in series circuit relation with the armature winding RMa of the rheostat motor RM during acceleration to the highest speed.

During the deceleration cycle in the case of a one-floor run, it is necessary that the rheostat motor RM operate at a higher speed than it does in the case of deceleration from the highest speed. This is due to the fact that the elevator car attains a higher speed at the time deceleration is initiated, in the case of the one-floor run, than it does at the corresponding position in the hatchway, in the case of deceleration from the highest speed on a run other than a one-floor run, and therefore the speed of operation of the rheostat motor must be increased in order to effect the necessary slow down over an equal distance.

As will be recalled from the previous explanation of the sequence of operations in decelerating the elevator car from the highest speed on a run other than a one-floor run, resistors R2 and R3 were included in series-circuit relation with the armature winding RMa of the rheostat motor RM. In the case of deceleration from the intermediate speed which is highest speed for one-floor runs, the resistor R2 is short-circuited by contact members d of relay 55, and thus only the resistor R3 remains in series-circuit relation with the armature winding of the rheostat motor. Obviously, a greater voltage is applied to the armature winding of the rheostat motor due to the lesser resistance included in series-circuit relation therewith, and this, of course, results in a higher speed of operation of the rheostat motor in the case of deceleration from intermediate speed during one-floor runs than in the case of deceleration from highest speed during runs other than one-floor runs.

The regulating generator RG functions in the same manner and to the same effect during one-floor runs as it does during runs of greater extent.

It will be seen, therefore, that I have disclosed an elevator control system including a regulating generator for causing the elevator car to move at speeds in close conformity to those of a predetermined speed curve during the operation thereof, and embodying motor-operated rheostat control means whereby the operation of the regulating generator is effective without causing sudden changes in the speed of the elevator car.

It will also be seen that I have disclosed novel means for controlling the operation of the rheostat operating motor as well as other features of control adapted to effect a smooth speed characteristic of operation of an elevator car in close conformity to a predetermined desired speed characteristic therefor.

My invention is capable of various modifications without departing from the spirit thereof, and I do not desire, therefore, that it be limited in any manner except as necessitated by the scope of the prior art and by the scope of the appended claims.

I claim as my invention:

1. In an elevator system, an elevator car, a motor for driving said car, a generator for supplying power to said motor, a field winding for said generator adapted to be variably excited to control the direction of movement and speed of said motor, and means for controlling said field winding including a rheostat, motive means for adjusting said rheostat, means for starting said motive means, and means operable in accordance with the movement of said motive means for stopping it.

2. In an elevator system, an elevator car movable in a hatchway, a motor for driving said car, means for controlling said motor including a rheostat, motive means operable to adjust said rheostat, and means including means operable in accordance with the movement of said motive means, for automatically controlling said motive means to cause it to stop unless said car has attained a predetermined position in the hatchway.

3. In an elevator system, an elevator car movable in a hatchway, a motor for driving said car, means for controlling said motor including a rheostat, motive means operable to adjust said rheostat, and means for controlling said motive means while said car is moving, comprising means operable in accordance with the motive means for automatically stopping it, and means operable in accordance with the position of the car in the hatchway for rendering said stopping means ineffective.

4. In an elevator system, an elevator car movable in a hatchway, a motor for driving said car, means for controlling said motor including a rheostat, means including means operable in accordance with the position of the car in the hatchway for effecting an adjustment of said rheostat to cause said motor to partially decelerate said car, and means including motive means controlled in accordance with the position of the car in the hatchway, for adjusting said rheostat in a comparatively large number of small incremental changes prior to the stopping of the car.

5. In an elevator system, an elevator car movable in a hatchway, a motor for driving said car, a generator for supplying power to said motor, a field winding for said generator adapted to be variably energized to control the direction of movement and speed of said motor, and means for controlling the energization of said field winding including a rheostat, motive means for adjusting said rheostat, and means controlled by the stopping of the car for controlling said motive means to adjust said rheostat into a predetermined condition.

6. In an elevator system, an elevator car movable in a hatchway, a motor for driving said car, means for controlling said motor including a rheostat, motive means for adjusting said rheostat, means operable in accordance with the position of the car in the hatchway for controlling said motive means while said car is moving, to effect an adjustment of said rheostat to cause the motor to decelerate the car, and means operable to cause said motor to stop said car upon the approach of said car within a predetermined distance of a selected position unless said motive means functions to adjust the rheostat and thereby decelerate the car.

7. In an elevator system, an elevator car movable in a hatchway, a motor for driving the car, means for controlling said motor including a rheostat, motive means for adjusting said rheostat to control the speed of said motor, control means for said motive means including means operable in accordance with the position of said car in the hatchway for starting said motive means and means operable in accordance with the movement of said motive means for stopping it.

8. In an elevator system, an elevator car movable in a hatchway, a multi-speed motor for driving said car at a plurality of different speeds, control means for said motor for effecting the operation thereof at the various speeds including a rheostat, motive means for adjusting the rheostat, and means operably responsive to the operation of the control means to cause the car to be driven by the said motor at a predetermined speed, for controlling the said motive means to cause it to operate at a different speed than when said motor control means is so operated as to cause said car not to travel at said predetermined speed.

9. In an elevator system, an elevator car movable in a hatchway, a multi-speed motor for driving said car at a plurality of different speeds, control means for said motor, including an adjustable rheostat for effecting the acceleration of said motor to a plurality of different predetermined speeds and deceleration therefrom, motive means for adjusting said rheostat, and means operably responsive to the operation of said motor control means to cause the motor to accelerate to one of the predetermined speeds, for effecting the operation of said rheostat adjusting motive means immediately subsequent to the acceleration of said motor, at a speed different than that at which it operates during deceleration of said motor immediately subsequent to an acceleration of said motor to a different one of the predetermined speeds.

10. In an elevator system, an elevator car movable in a hatchway, a multi-speed motor for driving said car at a plurality of different speeds, control means for said motor, including an adjustable rheostat, for selectively effecting the acceleration of said motor to a predetermined maximum speed or to a predetermined lower speed as well as deceleration from each of said speeds, motive means operable to adjust the rheostat to effect acceleration and deceleration of said motor, and means for controlling said rheostat-adjusting motive means to cause it to operate at a lower speed during deceleration of said motor immediately subsequent to acceleration thereof to the predetermined maximum speed than during deceleration of said motor immediately subsequent to acceleration thereof to only the predetermined lower speed.

11. In an elevator system, an elevator car movable in a hatchway, a motor for driving said car, a generator for supplying power to said motor, a field winding for said generator adapted to be variably excited to control the direction of movement and speed of said motor, means for controlling the excitation of the said field winding to effect acceleration and deceleration of said motor to and from a plurality of different predetermined speeds, including a regulating generator for causing said motor to effect an acceleration and deceleration of said car in close conformity to a predetermined speed characteristic, and means operably responsive to the operation of said field-excitation control means to cause said motor to accelerate to one of said predetermined speeds, for effecting a different rate of change of excitation upon deceleration therefrom, than during deceleration immediately subsequent to the operation of said field-excitation control means to cause said motor to accelerate to another of said predetermined speeds.

12. In an elevator system, an elevator car movable in a hatchway, a multi-speed motor for driving said car at a plurality of different speeds, control means for said motor for effecting the operation thereof at the various speeds including a rheostat, motive means for adjusting the rheostat, and means operably responsive to operation of the control means for causing the motive means to run at one speed when the car is being decelerated from one speed operation and for causing the motive means to run at another speed when the car is being decelerated from another speed operation.

13. In an elevator system, an elevator car movable in a hatchway, a motor for driving said car, a generator for supplying power to said motor, a field winding for said generator adapted to be variably energized to control the direction of movement and speed of said motor, means for controlling the energization of said field winding to cause said motor to drive the car in substantial conformity with a predetermined speed characteristic including a rheostat for controlling the current in said field winding and a regulating voltage means adapted to vary the current in the field winding in accordance with the difference between the actual speed of the motor and a predetermined speed as intended by the adjustment of the said rheostat, said variation of current being such as to effect a decrease in the difference between the actual speed of the motor and the predetermined speed desired, and means for effecting the operation of said regulating voltage means whereby it does not effect substantial divergence from said predetermined speed characteristic, said means including motive means for effecting the adjustment of said rheostat in a succession of a large number of comparatively small incremental changes, and means operable in accordance with the position of the car in the hatchway for automatically controlling said motive means.

14. In an elevator system, an elevator car movable in a hatchway, a motor for driving said car, a generator for supplying power to said motor, a field winding for said generator adapted to be variably excited to control the direction of movement and speed of said motor, means for controlling the excitation of the said field winding including rheostat and motive means for adjusting said rheostat in a plurality of incremental changes of predetermined value to effect acceleration and deceleration of said motor to correspondingly accelerate and decelerate said car to and from a plurality of different predetermined speeds, and means dependent upon the operation of said field winding control means to cause said motor to drive the car at one of the predetermined speeds, for changing the predetermined value of each subsequent incremental change in the adjustment of said rheostat.

15. A control system for an elevator car comprising a motor for driving said car, means for controlling said motor comprising rheostat mechanism for varying the excitation of said motor in a succession of steps to decelerate said motor, motor driven means disposed to operate said mechanism at a predetermined rate, and means responsive to the position of said car for controlling said motor driven means.

16. A control system for an elevator car comprising a hoisting motor for driving said car, means for controlling said motor comprising rheostat mechanism for varying the excitation of said hoisting motor in a succession of steps to decelerate said hoisting motor, a motor for operating said rheostat, and means responsive to the position of said car for controlling said rheostat motor.

17. A control system for an elevator car comprising a hoisting motor for driving said car, means for controlling said car comprising mechanism for varying the excitation of said motor in a succession of steps to decelerate said hoisting motor, motive means disposed to operate said mechanism at a predetermined rate, means responsive to the position of said car for starting said motive means, and additional means responsive to the position of said car for controlling the rate of operation of said motive means during the course of a decelerating operation.

18. A control system for an elevator car comprising a hoisting motor for driving said car, means for decelerating said motor comprising a rheostat and a driving motor therefor, means responsive to the position of said car for starting said rheostat motor to cause a decelerating operation, and additional means responsive to the position of said car for controlling the operation of said motor during the course of said decelerating operation.

19. A control system for an elevator car comprising a hoisting motor for driving said car, means for controlling said motor comprising rheostat mechanism for varying the excitation of said hoisting motor in a succession of steps, motive means for said mechanism, means responsive to the position of said car for starting said motive means to cause a decelerating operation of said hoisting motor, additional means responsive to the position of said car, and means controlled jointly by said motive means and by said additional means for controlling said motive means during the course of said decelerating operation.

20. A control system for an elevator car comprising a hoisting motor for driving said car, means for controlling said motor comprising rheostat mechanism operable to vary the excitation of said hoisting motor in a succession of steps to decelerate said hoisting motor, a motor for operating said rheostat mechanism, means responsive to the movement of said car, mechanism responsive to said car movement means for starting said rheostat motor to cause a decelerating operation, and means controlled by operation of said rheostat motor for cooperating with said car movement means to control said rheostat motor during the course of said decelerating operation.

21. In combination, a motor having an armature, a generator having an armature and a field winding, electrical connections between said armatures, a dynamo-electric machine having a field winding disposed for excitation in proportion to the value of current in said connections, a potentiometer resistor electrically connected across the armature of said dynamo-electric machine, and means for electrically connecting a terminal of said generator field winding to any one of a plurality of points on said resistor.

22. In combination, a motor having an armature, a generator having an armature and a field winding, electrical connections between said armatures, a variable source of excitation for said field winding to provide different operating speeds for said motor, a dynamo-electric machine having an armature and a field winding disposed for excitation in accordance with the value of current exchanged between said armatures, a potentiometer resistor connected across the armature of said dynamo-electric machine, and means for electrically connecting said field winding to said variable source, comprising means for electrically connecting a terminal of said field winding to any one of a plurality of points on said resistor.

23. In combination, a motor having an armature, a generator having an armature and a field winding, connections between said armatures, and control means comprising a source of excitation for said field winding and switching means associated therewith to cause low or high speed operation of said motor, a dynamo-electric machine having an armature for supplying a cumulative component of excitation to said winding proportional to the current in said connections, a potentiometer resistor, means for connecting said resistor across the armature of said dynamo-electric machine, means effective upon operation of said control means to cause low speed operation of said motor to electrically connect a terminal of said generator field winding to one point on said resistor to cause said dynamo-electric machine to have a predetermined effect upon the excitation of said field winding, and means effective upon operation of said control means to cause high speed operation of said motor to electrically connect said terminal to a different point on said resistor to thereby increase the effect of said dynamo-electric machine upon the excitation of said field winding.

KENNETH M. WHITE.